United States Patent Office 3,328,666
Patented June 27, 1967

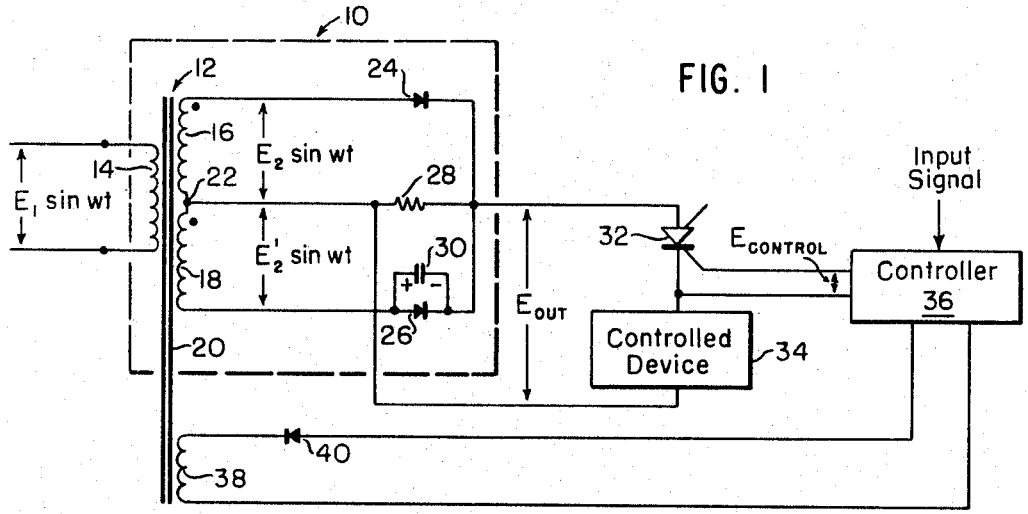
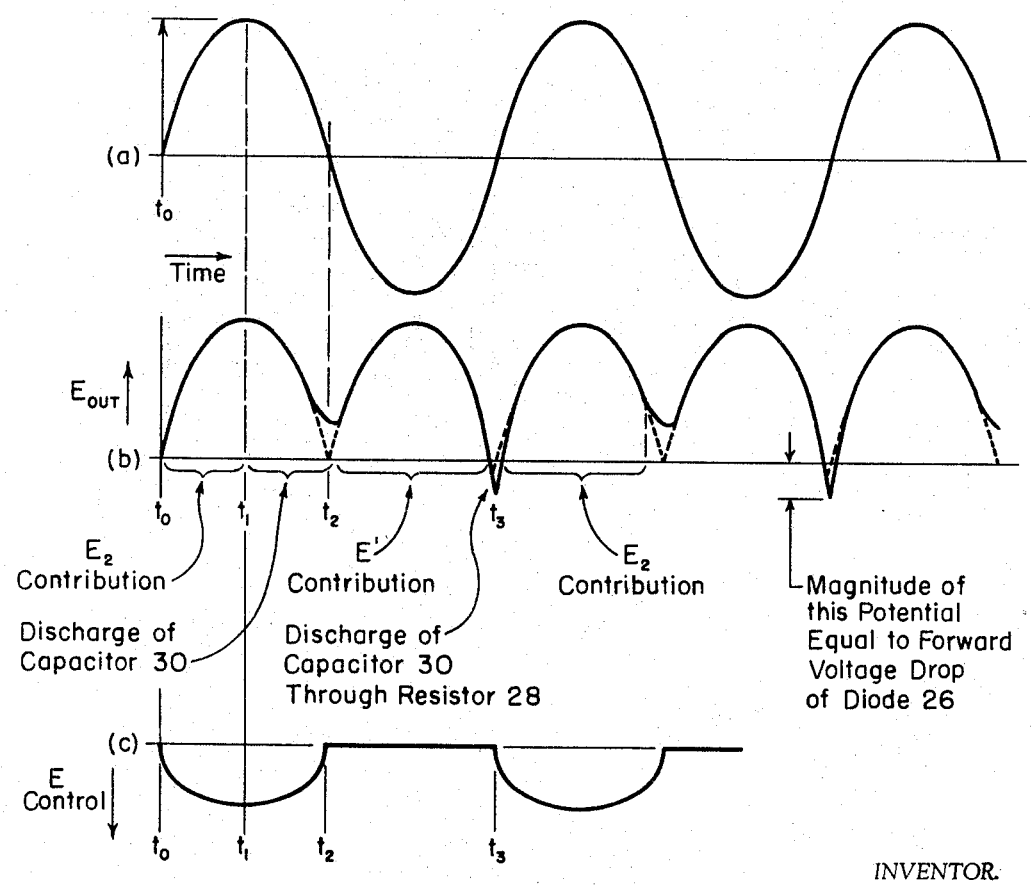
FIG. 2
INVENTOR.
LYMAN H. WALBRIDGE

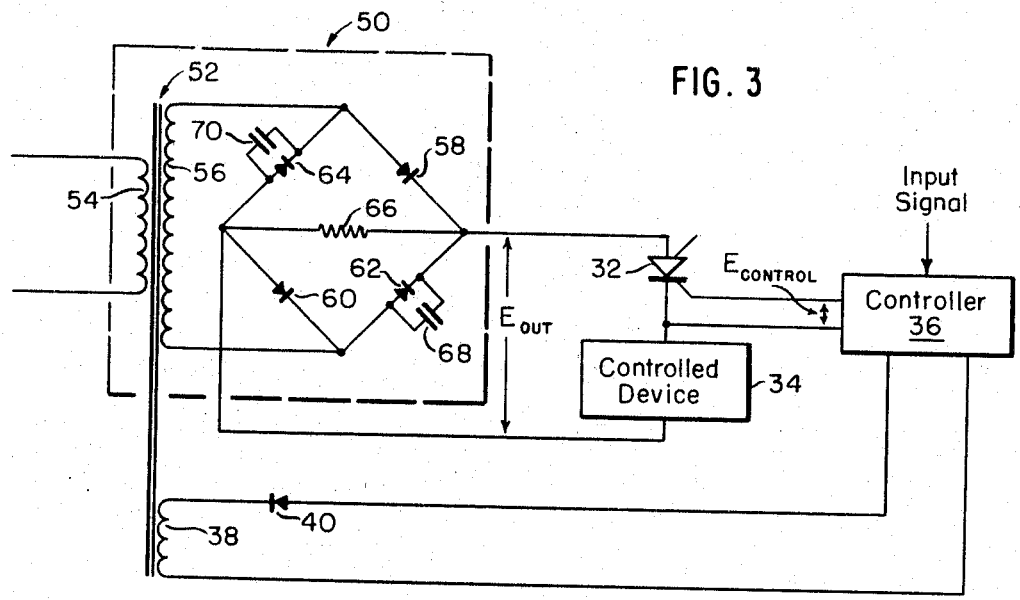

3,328,666
RECTIFYING AND WAVE SHAPING CIRCUIT
Lyman H. Walbridge, Ashland, Mass., assignor to Fenwal Incorporated, Ashland, Mass., a corporation of Massachusetts
Filed Jan. 27, 1964, Ser. No. 340,436
10 Claims. (Cl. 321—43)

My invention relates to an improved rectifying and wave shaping circuit adapted to provide an output waveform particularly useful for supplying controlled electronic switches such as thyratrons, silicon controlled rectifiers and silicon controlled switches. More particularly it relates to a novel full wave rectifier circuit which provides an output waveform having characteristics which make it particularly useful for the described application when the control signals are synchronous with the supply voltage.

Thyratrons and solid state devices which behave like thyratrons, such as silicon controlled rectifiers and silicon controlled switches (hereinafter generally referred to as controlled electronic switches), have the characteristic that once conduction has been initiated by supplying the appropriate anode-cathode and grid-cathode potentials, conduction will continue so long as the anode-cathode potential is maintained in polarity and above a predetermined level regardless of the grid-cathode voltage. In certain applications of these devices, the control signal supplied to the grid-cathode (or equivalent) terminals is synchronized with the frequency of the primary power supply i.e. with the line frequency. A conventional fullwave rectifier circuit will supply voltage of appropriate polarity to maintain the controlled electronic switch in conduction over the full 360° of one cycle. But without filtering, the power supply waveform will drop to zero after 180° of one cycle of the supply voltage and the electronic switch will cease conduction. If filtering is provided, however, complex arrangements have heretofore been required to remove the anode voltage periodically and, desirably, to apply a potential of reverse polarity to the anode-cathode terminals of the controlled switch.

The circuit of my invention provides a rectified output voltage waveform which maintains a sufficiently high value over almost 360° of one cycle of the supply voltage so that once conduction is initiated it will continue over almost the entire cycle. However, it also provides a short period of reverse polarity voltage at a predetermined time in each cycle to insure that the controlled switch ceases conduction during this period so that a synchronized control signal may freely determine whether or not the controlled electronic switch will conduct during the next cycle of the applied voltage. All of this is accomplished by relatively simple modification of a conventional full wave rectified power supply.

Accordingly it is a principal object of my invention to provide an improved power supply circuit for use with controlled electronic switches. Another object of my invention is to provide a circuit of the type described for use with controlled electronic switches where the control signal is supplied in synchronism with the line frequency. A further object of my invention is to provide a circuit of the type described in which the output waveform is of one polarity for almost the entire cycle of the applied line voltage and of a magnitude sufficient to maintain a controlled electronic switch in conduction, but which reverses polarity for a very short period at a predetermined time in each cycle. A still further object of my invention is to provide a circuit of the type described which is simple and economical of construction.

Other objects of the invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawings, in which:

FIGURE 1 is a schematic diagram of a power supply for controlled electronic switches made according to my invention together with certain auxiliary apparatus, shown in block diagram form to illustrate the manner in which the circuit may be used;

FIGURE 2 is a series of three timing diagrams illustrating the manner in which the output waveform of the power supply in FIGURE 1 is related to the applied voltage and to the control voltage; and FIGURE 3 is a schematic diagram similar to FIGURE 1, showing my invention applied to an alternative power supply circuit.

In FIGURE 1 the improved power supply of my invention is shown enclosed within the dotted rectangle generally labeled 10. The apparatus outside this rectangle is useful in explaining the function and operation of my invention but forms no part of it.

As illustrated in FIGURE 1, a power supply made in accordance with my invention includes a transformer, generally indicated at 12 having a primary winding 14 which is connected to a source of alternating potential (not shown) which is the primary energy supply. The transformer includes a pair of secondary windings 16 and 18 and a core 20. The secondary windings are so wound that the voltages appearing across each of them are 180° out of phase when measured between the outer terminal of the windings and the center tap 22. A pair of diodes 24 and 26 are provided. The diodes are connected as shown if the output voltage is to be positive with respect to the transformer center tap, but are reversed if a negative voltage is desired. While I prefer to use silicon diodes as rectifiers, it should be understood that any of the known types of solid state or vacuum diodes might be used in my circuit as will more fully appear below. A load resistor 28 is connected between the cathodes of the two diodes and the center tap 22, but it is to be understood that in some instances the equivalent resistance of the circuit to which the output waveform is supplied may make this resistor unnecessary as will be explained below. A capacitor 30 is also provided in parallel with diode 26.

It will be apparent to those skilled in the power supply art that the circuit enclosed within the dotted rectangle 10 consists of a conventional full wave rectifier with a capacitor connected across one of the rectifier diodes and a resistor 28 in parallel with the load.

The circuit operation may be explained by referring to FIGURE 1 and to FIGURES 2(a) and 2(b). The voltage waveform applied to the primary winding 14 of the transformer 12 is illustrated in FIGURE 2(a) and this identical waveform, except for a change in mignitude appears across the winding 16, as measured between the outer terminal and the center tap. A voltage waveform identical to that on winding 16 but out of phase by 180° appears across the winding 18.

For purposes of explanation, assume capacitor 30 is uncharged and the input waveform of FIGURE 2(a) is at the point illustrated when power is supplied to the circuit ($t_0$). As the input voltage rises in amplitude in the positive direction diode 24 will conduct, but diode 26 will not, since as the anode of diode 24 becomes more positive, that of diode 26 is becoming more negative because of the 180° phase reversal. The conduction of diode 24 and the non-conduction of diode 26 will result in the capacitor 30 being charged to a voltage equal to twice the peak amplitude of the transformer secondary voltage one quarter cycle (90°) after time $t_0$ at the time $t_1$, with a polarity such that the right hand plate (as viewed in FIGURE 1) is positive with respect to the left hand plate. The applied voltages across the secondary windings 16 and 18 now begin to diminish in magnitude. As they do so, capacitor 30 discharges through the load resistor 28 and the load connected to it and through the secondary winding 18 of transformer 12. By appropriate selection of the size of capacitor 30 and resistor 28 the discharge time constant of the capacitor 30 may be made sufficiently long so that the voltage across the capacitor has not diminished to zero by the time the applied voltage has reached zero. This is illustrated in FIGURE 2($b$), the output voltage waveform from the power supply. As there indicated at time $t_2$, the capacitor voltage which has not reached zero prevents the output voltage from reaching a zero value, even though the applied voltage (as indicated by the dotted lines) has reached zero. In practice, the size of the capacitor and load resistor are so chosen that the minimum voltage reached by the output waveform in this portion of the cycle is sufficient to maintain the controlled electronic switch reliably conducting.

After the applied voltage from winding 18 passes through zero, the voltage at the lower end of winding 18 (as seen in FIGURE 1) begins to increase in magnitude in the positive direction and the voltage at the upper end of winding 16 (as seen in FIGURE 1) begins to increase in the negative direction. The diode 26 does not begin to conduct however, since capacitor 30 is still charged in a direction to prevent conduction. The positive voltage across winding 18 causes the capacitor 30 to discharge more rapidly than before since the voltage across the winding is aiding current flow from the capacitor rather than opposing it as in the first half-cycle. The result is that the capacitor 30 is rapidly discharged and, upon its discharge, diode 26 begins conduction. The voltage across the load then follows the input voltage again rising to a peak value and diminishing with the applied voltage. However during this period when diode 26 is conducting, the capacitor 30 becomes charged to a value equal to the forward voltage drop of diode 26. The polarity of this voltage drop is such that the left hand plate of the capacitor is positive with respect to the right as seen in FIGURE 1. Thus when the supply voltage and the voltage across the windings 16 and 18 again reaches zero, or a value close to it, capacitor 30 discharges through the resistor 28 and the load circuit in parallel with it. The direction of current flow of this discharge is such that the voltage across resistor 28 is opposite to that normally supplied by the power supply. The result of this reverse current flow, which exists for a very short time because of the low forward resistance of the two diodes, is to provide a negative voltage at the load as illustrated in FIGURE 2($b$) at time $t_3$. This negative voltage insures that the controlled electronic switch is reliably turned off at least once each cycle so that a synchronized control signal can turn it on if desired during the next cycle of the applied voltage.

Thus, the power supply illustrated in FIGURE 1 provides a waveform of the shape illustrated in FIGURE 2($b$) to its load circuit connected in parallel with the resistor 28. As explained above, this waveform has particular utility in circuits using controlled electronic switches, as will be discussed below.

In a practical circuit embodying my invention the following components were used for an application wherein the supply voltage had a frequency of 60 cycles per second:

Transformer turns ratio was such that the peak voltage across windings 16 and 18 was 38 volts Diodes 24 and 26 were silicon diodes, type 1N538;

Resistor 28 was 2.2 kilohms, ½ watt and

Capacitor 30 was 0.22 microfarad at 100 volts

In FIGURE 1, in addition to illustrating the power supply, I have shown how it might be used in connection with a controlled electronic switch. Thus, the switch itself, a silicon controlled switch, is shown at 32, with its anode connected to the normally positive terminal of the supply voltage. The cathode of the switch is connected, through a device 34 whose operation it is desired to control in response to control signals, to the normally negative terminal of the supply voltage. A controller 36 is provided which supplies appropriate control signals between the control terminal (grid) and cathode of the switch 32. Preferably although not necessarily these control signals are amplitude modulated signals which are synchronous with the line frequency. Thus, I have illustrated a further secondary winding 38 on the transformer 12 which is connected through a diode 40 to supply an excitation signal which is the negative half cycles of the supply voltage, to the controller 36.

In response to its input signal, the controller 36 modulates the excitation signal, permitting it to increase in value when it is desired to activate the controlled device 34. When a half cycle of voltage of sufficient magnitude is applied to the grid-cathode terminals of the switch 32 in synchronism with a positive anode signal, the switch conducts, activating the controlled device. Thereafter, the control signal is of no further effect until the supply voltage diminishes to a negative value as at time $t_3$ and shuts the switch off. Thereafter the controller may again turn the switch on, if appropriate, or leave it in the off condition if that is the proper action. However, because of the characteristics of the waveform provided by the power supply of my invention the controller needs to determine only once each cycle whether the controlled device should or should not be activated. In FIGURE 3 I have illustrated another embodiment of a rectifying and wave-shaping circuit incorporating my invention. As there illustrated, the circuit of my invention is shown within the rectangle 50. The apparatus outside this rectangle is identical to that shown and described in connection with FIGURE 1 and is for the same purpose.

The transformer 52 shown in FIGURE 3 includes a primary winding 54, corresponding to winding 14 in FIGURE 1. However, instead of a center-tapped secondary winding as in FIGURE 1, only a single winding 56 is provided. A four-diode bridge, including diodes 58, 60, 62 and 64 of conventional design is connected as shown across the winding 56. A resistor 66 is connected to the diagonal terminals of the bridge to which the load is also connected. A capacitor 68 is connected in parallel with diode 62 and a second capacitor 70 is connected in parallel with diode 64. The operation of the circuit of FIGURE 3 is substantially the same as that of FIGURE 1. Thus, assume both capacitors are uncharged and the output voltage across the terminals of winding 56 is increasing in a direction such that diodes 58 and 60 are conducting having just passed through zero. As the voltage across the transformer terminals increases, the capacitors 68 and 70 will charge to the applied value of the voltage, the upper or right-hand plate of each being positive with respect to the lower or left-hand plate. After the applied voltage passes through its maximum value and begins to decrease, the two capacitors begin to discharge. Capacitor 68 discharges through the load and resistor 66 and then through diode 60. Capacitor 70 discharges through diode 58 and then through the load and resistor 66 in parallel. The time constant of discharge, determined by the product of the effective capacitance of capacitors 68 and 70 in series and the equivalent resistance of the parallel combination of resistor 66 and the load, is sufficiently long so that the voltage across the two capacitors does not reach zero by the time the applied voltage reaches zero as at the time $t_2$ in FIGURE 2b.

After the voltage across the terminals of the winding 56 reaches zero, it begins to increase in value in the opposite direction. However, as noted in connection with FIGURE 1, the diodes 62 and 64 do not begin to conduct immediately because capacitors 68 and 70 are charged in a direction to prevent immediate conduction. The capacitors rapidly discharge because the applied voltage is aiding this discharge and then diodes 62 and 64 supply power to the load. Except for the diode drop, the voltage supplied to the load is substantially the voltage appearing across the terminals of winding 56 during the remainder of the second half cycle of the applied voltage. Capacitors 68 and 70, during this second half-cycle are charged to the forward bias voltage of diodes 62 and 64 respectively. Thus the lower left plate of each capacitor is positive with respect to the upper right plate.

When, at the end of the half cycle, the voltage across the terminals of winding 56 reaches zero (or a value close to it) the two capacitors will discharge in a direction to cause current to flow in a reverse direction through the load as at time $t_3$ in FIGURE 2(b). At this time, the two capacitors are effectively connected in series through the winding 56 and discharge through the load in a direction such that current flow (as usually defined) is from left to right as seen in FIGURE 3. As explained in connection with FIGURE 1, the negative or reverse voltage supplied to the load insures that the controlled electronic switch is reliably turned off at least once each cycle.

Thus the circuit of FIGURE 3 performs in substantially the same fashion as that of FIGURE 1. However, in FIGURE 3 the total voltage across the transformer secondary winding is only one half that across the secondary winding of FIGURE 1. This may substantially reduce insulation requirements at the cost of only two diodes and a capacitor. For this reason the circuit of FIGURE 3 may be preferred for some applications of my invention.

A more complete description of a control circuit using the power supply of my invention is described in the copending patent application of Ireneusz Siwko entitled, "Relay Control Circuit," Ser. No. 448,218 filed Apr. 8, 1965, which is also assigned to the assignee of the present invention.

Thus I have provided an improved rectifying and wave shaping circuit for use with controlled electronic switches such as thyratrons, silicon controlled switches and silicon controlled rectifiers. My improved circuit, which requires only relatively minor modifications in a conventional full wave rectifier circuit, is particularly useful in applications where the control signal is synchronous with the voltage supplied to the power supply.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. An improved rectifying and wave shaping circuit comprising, in combination, a source of alternating voltage, rectifying means, including at least two series connected diodes connected across said alternating voltage source, a first of said diodes conducting when said alternating voltage has a first polarity and a second of said diodes conducting when said alternating voltage has a second polarity opposite said first polarity, a capacitor connected in parallel with said second diode, whereby said capacitor is charged in a first sense when said first diode is conducting, means connecting one terminal of a resistive load to the junction of said series connected diodes, and circuit means providing a return path from a second terminal of said resistive load to said alternating current source, said circuit means comprising means for discharging said capacitor through said load and charging the capacitor in a sense opposite said first sense and to a magnitude equal to the forward drop across said second diode when said second diode is conducting, whereby the voltage across said resistor is briefly reversed each time said alternating voltage goes from said second to said first polarity.

2. The combination defined in claim 1 in which the time constant determined by the product of the resistance of said resistive load and the capacitance of said capacitor is sufficiently long that said capacitor will not discharge from the maximum value to which it is charged to substantially zero in a time corresponding to one-quarter cycle of the applied alternating voltage.

3. The apparatus of claim 1, in which said alternating source comprises three output terminals including a first terminal intermediate in potential between a second and a third terminal, said second and third terminals being connected across said series connected diodes, and in which said circuit means comprises a direct connection between said resistive load and said first terminal.

4. The combination defined in claim 3, in which the time constant determined by the product of the resistance of said resistive means and the capacitance of said capacitor is sufficiently great that said capacitor will not discharge from a voltage equal to twice the peak value of the applied alternating signal to substantially zero in a time corresponding to one-quarter cycle of the applied alternating voltage.

5. The apparatus of claim 1, in which said circuit means comprises a three-terminal network, first and second terminals of said network being connected across said alternating voltage source and the third terminal of said network being connected to the second terminal of said load, said network further comprising a third diode connected between said first terminal and said third terminal and poled to conduct when said first diode is conducting, a fourth diode connected between said second terminal and said third terminal and poled to conduct when said second diode is conducting, and a second capacitor connected in parallel with said fourth diode, whereby said second capacitor is charged and discharged in the same manner and at the same time as the capacitor recited in claim 1.

6. The combination defined in claim 5 in which the time constant determined by the product of the resistance of said resistive load and the capacity of said capacitors is sufficiently great that said capacitors will not discharge from the maximum value to which they are charged to substantially zero in a time corresponding to one quarter cycle of the applied alternating voltage.

7. The combination defined in claim 6 in which said diodes are silicon diodes which exhibit a measurable forward voltage drop.

8. An improved rectifying and wave shaping circuit comprising, in combination, a source of alternating voltage, rectifying means including a diode bridge, means connecting one diagonally opposite pair of terminals of said bridge across said voltage source, means connecting the other diagonally opposite pair of terminals of said bridge to a resistive load circuit, a first capacitor connected in parallel with one of the diodes of said bridge in a first arm of the bridge, and a second capacitor connected in parallel with a second diode of said bridge, said second diode being in an arm of said bridge opposite and non-adjacent said first arm, whereby both of said capacitors are charged in a first sense on half-cycles of said source of a first polarity, and both are discharged and recharged in a second sense opposite said first sense to a magnitude equal for each capacitor to the forward drop across the diode connected in parallel with the capacitor on half-cycles of said source of a second polarity opposite said first polarity, producing an output voltage across said resistive load circuit that is of a first polarity over substantially a full cycle of said source and is of a second polarity when said source voltage changes from said second to said first polarity.

9. The combination defined in claim 8 in which the time constant determined by the product of the resistance of said load circuit and the capacitance of the capacitors in said circuit is sufficiently great that said capacitors will not discharge from a voltage equal to the peak value of the applied alternating signal to substantially zero in a time corresponding to one quarter cycle of the applied alternating voltage.

10. The combination defined in claim 8 in which the diodes forming said bridge are silicon diodes.

References Cited

UNITED STATES PATENTS

| | | | |
|---|---|---|---|
| 3,005,163 | 10/1961 | Dulberger et al. | 321—8 X |
| 3,012,181 | 12/1961 | Schultz | 321—2 |
| 3,019,381 | 1/1962 | Howard | 321—8 X |
| 3,242,420 | 3/1966 | Ulrey | 307—88 |

JOHN F. COUCH, *Primary Examiner.*

W. M. SHOOP, *Assistant Examiner.*